(12) United States Patent
Bossemeyer, Jr. et al.

(10) Patent No.: US 7,577,243 B1
(45) Date of Patent: Aug. 18, 2009

(54) METHOD, SYSTEM, AND ARTICLE FOR DETERMINING AN AVAILABILITY OF A TELECOMMUNICATION DEVICE

(75) Inventors: Robert Wesley Bossemeyer, Jr., St. Charles, IL (US); Edmond W. Israelski, Lake Barrington, IL (US); Jordan Howard Light, Chicago, IL (US); Denise Violetta Kagan, Riverwood, IL (US); Jose M. Cruz, Naperville, IL (US); Bruce Edward Stuckman, Algonquin, IL (US); Raymond Walden Bennett, III, Naperville, IL (US); Michael Steven Pickard, Highland Park, IL (US); Barry James Sullivan, Long Grove, IL (US); Richard Peter Krupka, Barrington, IL (US); Philip Martin Stebbings, Aurora, IL (US)

(73) Assignee: AT&T Intellectual Property 1, L.P., Reno, NV (US)

( * ) Notice: Subject to any disclaimer, the term of this patent is extended or adjusted under 35 U.S.C. 154(b) by 728 days.

(21) Appl. No.: 09/407,126

(22) Filed: Sep. 27, 1999

(51) Int. Cl.
    *H04M 3/42* (2006.01)
(52) U.S. Cl. .................................. 379/201.01
(58) Field of Classification Search .......... 705/1, 705/500, 7, 8, 9, 10, 11, 22, 26, 27; 379/201.03, 379/9.02, 9.03, 211.01, 32.01, 201.01
    See application file for complete search history.

(56) References Cited

U.S. PATENT DOCUMENTS

| | | | | |
|---|---|---|---|---|
| 3,614,328 A * | 10/1971 | McNaughton | ............... | 370/270 |
| 4,219,700 A * | 8/1980 | Panizzon et al. | ............ | 379/184 |
| 4,897,866 A * | 1/1990 | Majmudar et al. | ..... | 379/201.05 |
| 5,615,342 A | 3/1997 | Johnson | ....................... | 705/27 |
| 5,625,776 A | 4/1997 | Johnson | ....................... | 705/27 |
| 5,712,985 A | 1/1998 | Lee et al. | ....................... | 705/7 |
| 5,751,802 A | 5/1998 | Carr et al. | .............. | 379/201.12 |
| 5,758,257 A | 5/1998 | Herz et al. | ................... | 725/116 |
| 5,809,144 A | 9/1998 | Sirbu et al. | .................... | 705/53 |
| 5,835,087 A | 11/1998 | Herz et al. | .................. | 715/810 |
| 5,878,401 A | 3/1999 | Joseph | ........................ | 705/22 |
| 5,943,619 A * | 8/1999 | Coyne et al. | ................ | 455/433 |
| 5,978,681 A * | 11/1999 | Bertacchi | .................... | 455/445 |
| 6,324,273 B1 * | 11/2001 | Alcott | ........................ | 379/201 |
| 6,411,935 B1 * | 6/2002 | Gilles et al. | ..................... | 705/1 |

(Continued)

FOREIGN PATENT DOCUMENTS

EP      0 951 165     * 10/1999

OTHER PUBLICATIONS

Prohibit Switching Telephone Providers Without Customer Contest; House Bill 5280 as enrolled; Public Act 260 of 1998; 6 pages.*

*Primary Examiner*—Igor N Borissov
(74) *Attorney, Agent, or Firm*—Brinks Hofer Gilson & Lione

(57) ABSTRACT

A data structure, which identifies a party of a telecommunication network and a telecommunication feature unavailable to the party, is stored in a database. After storing the data structure, availability data is inputted. The availability data indicates an availability of the telecommunication feature to a portion of the telecommunication network which serves the party. The data structure and the availability data are processed to determine that the telecommunication feature has become available to the party.

27 Claims, 3 Drawing Sheets

U.S. PATENT DOCUMENTS

2001/0056362 A1* 12/2001 Hanagan et al. ................ 705/7
2003/0167473 A1* 9/2003 Klosterman et al. ......... 725/140
2003/0191650 A1* 10/2003 Turner et al. .................. 705/1

* cited by examiner

METHOD, SYSTEM, AND ARTICLE FOR DETERMINING AN AVAILABILITY OF A TELECOMMUNICATION DEVICE

TECHNICAL FIELD

The present invention relates to methods, systems, and articles for determining an availability of a telecommunication feature.

BACKGROUND OF THE INVENTION

To meet the needs of their customers, telecommunication service providers frequently introduce new products and services. Initially, some new products and services may be made available only to a subset of the customers of a telecommunication service provider. As hardware and software upgrades are performed in a telecommunication network, these new products and services become available to more of the customers. Thereafter, the product or service may become available to all customers.

To determine the availability of a product and/or a service, a customer may call a marketing representative of a telecommunication service provider. If the product and/or service is unavailable to the customer, the marketing representative informs the customer of same. The marketing representative may make a record of the call by writing a name and a telephone number of the customer who inquires about an unavailable product or service.

To inform a customer of the availability of a previously-unavailable product or service, a follow-up call to the customer may be made based on the aforementioned written record. However, this process is a manual process prone to delays and errors.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF PREFERRED EMBODIMENTS

To address the aforementioned challenges, the present invention provides a return call marketing tool. An interface is provided to capture individual customer interest in telecommunication features. A database responsive to the interface stores information for a plurality of customers' interest. A computer receives input which tracks the availability of features, and creates an action when a customer need can be fulfilled. The action can be easily followed-up by a sales or service representative to assist in making a sale to a customer. Using this tool, a telecommunication service provider can become more responsive to their customers' wants and needs.

Figure 1:
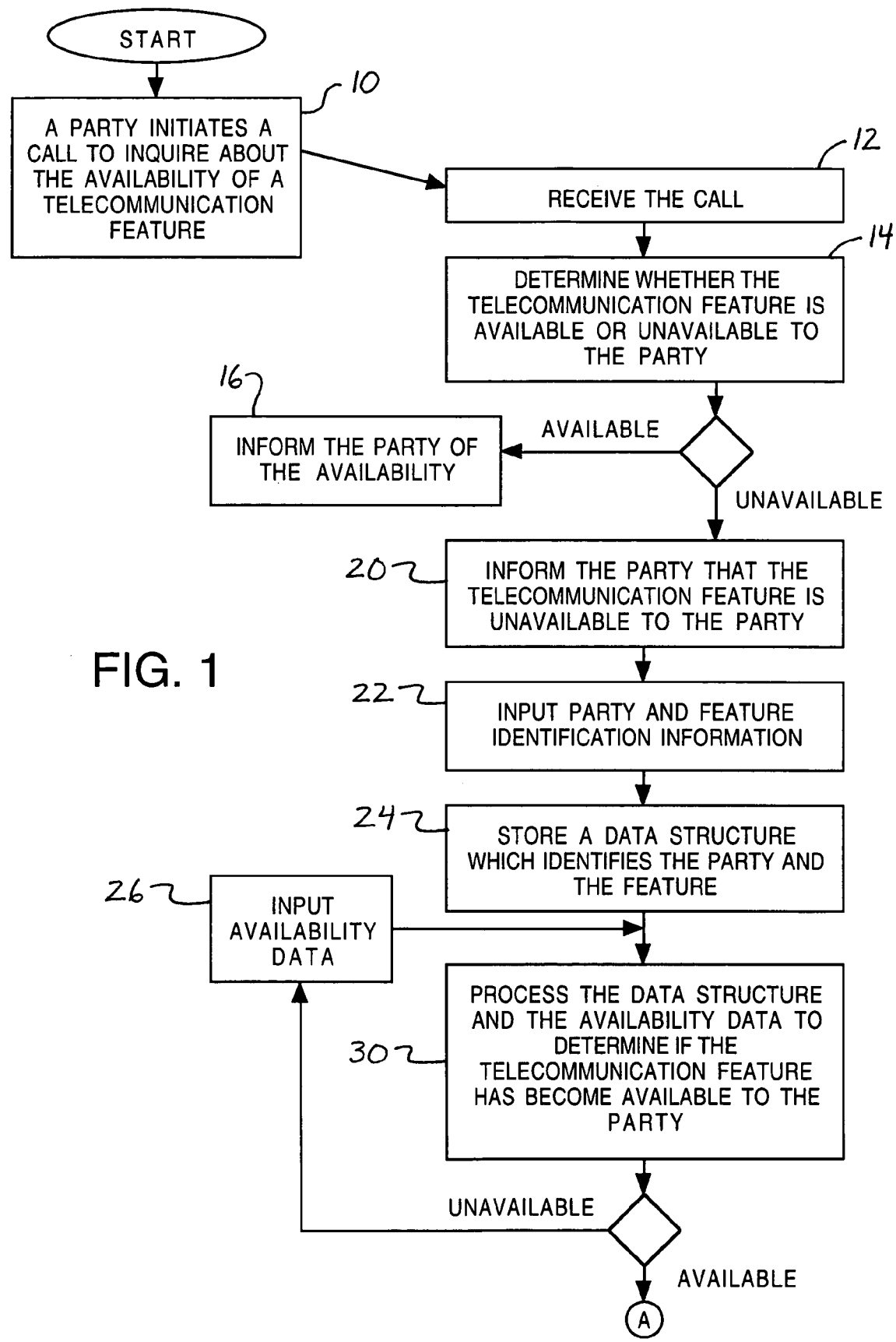
FIGS. 1 and 2 are a flow chart of an embodiment of a method in accordance with the present invention.
Figure 2:
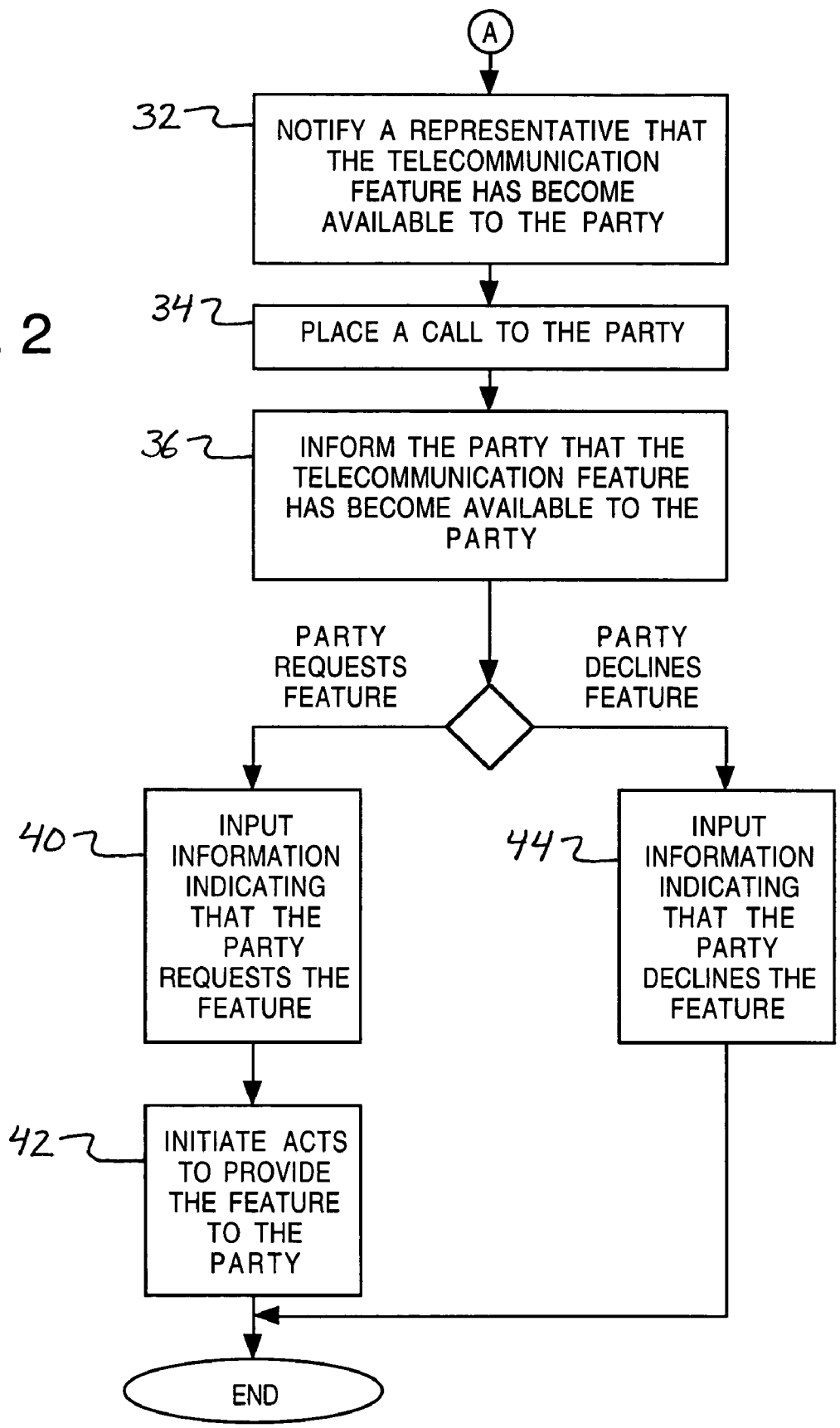
Figure 3:
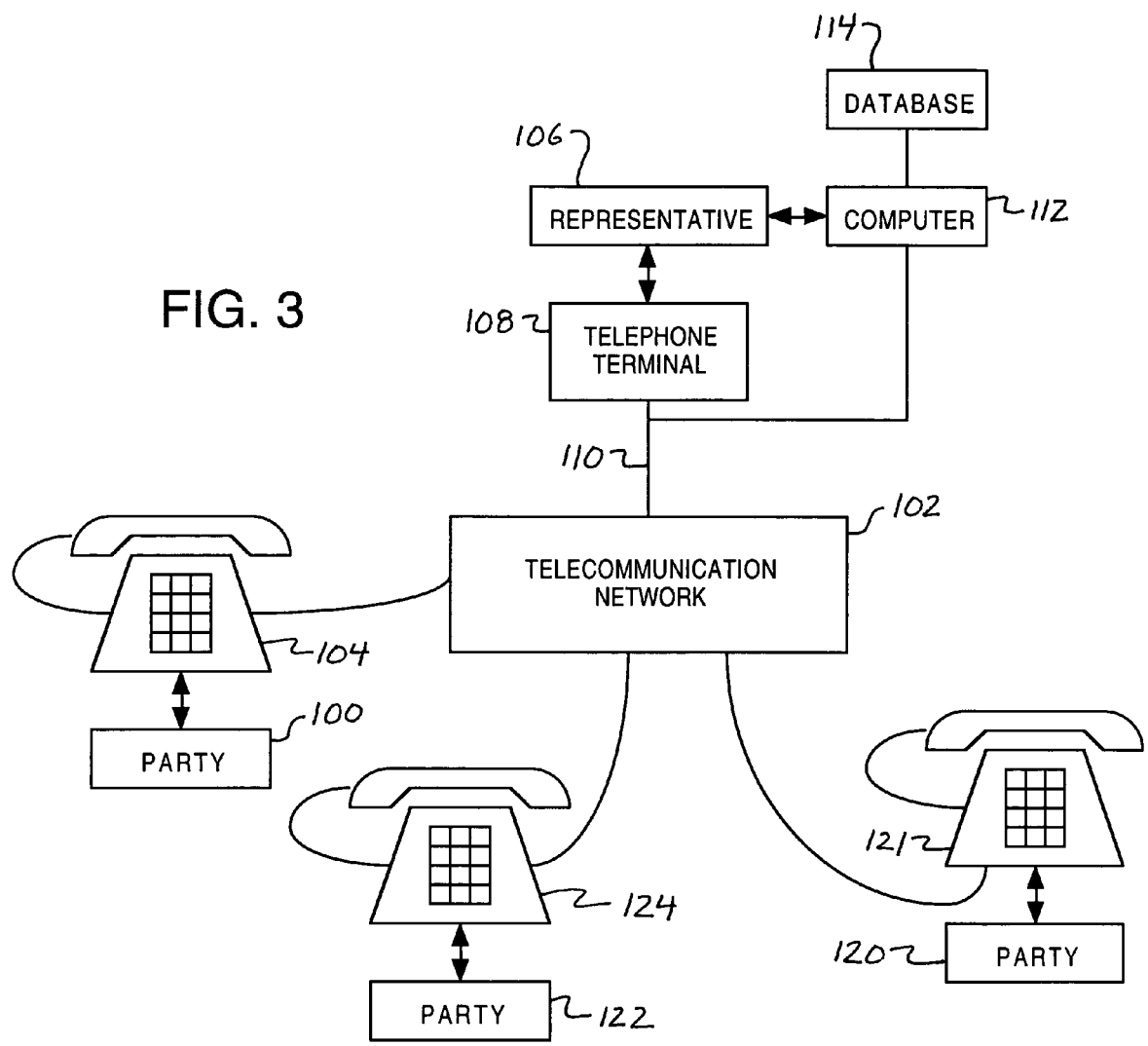
FIG. 3 is a schematic/block diagram of an embodiment of a system for performing the method.

A description of embodiments of the present invention is made with reference to FIGS. 1 and 2, which show a flow chart of an embodiment of a method in accordance with the present invention, and FIG. 3 which shows a schematic/block diagram of an embodiment of a system for performing the method. Based upon the herein-disclosed high-level description, one or more computer programs to direct one or more computers to perform the method is within the skill of a routineer in the art of telecommunications.

As indicated by block 10, a party 100 of a telecommunication network 102 initiates a telephone call to inquire about the availability of a telecommunication feature. The party 100 may initiate the telephone call by entering, dialing or otherwise providing a telephone number, such as a service number or a sales number, using a telephone terminal 104.

Examples of the telecommunication network 102 include, but are not limited to, a public switched telephone network and a private telephone network. The telephone network may comprise a wireline telephone network or a wireless telephone network. Examples of the telecommunication feature include a telecommunication service and a telecommunication product.

As indicated by block 12, the telephone call is received by a representative 106 of the telecommunication network 102. Examples of the representative 106 include a service representative, a marketing representative, and a sales representative. The representative 106 may receive the telephone call using a telephone terminal 108 in communication with a telephone line 110.

As indicated by block 14, the representative 106 determines whether the telecommunication feature is available or unavailable in a portion of the telecommunication network 102 that serves the party 100. If the telecommunication feature is available, the representative 106 may inform the party 100 of same in the telephone call, as indicated by block 16. Thereafter in the telephone call, the party 100 may communicate an intent to purchase or subscribe to the telecommunication feature. In response thereto, the representative 106 may initiate acts to provide the telecommunication feature to the party 100.

If the telecommunication feature is unavailable to the portion of the telecommunication network 102 that serves the party 100, the representative 106 may inform the party 100 of same in the telephone call, as indicated by block 20.

As indicated by block 22, information which identifies the party and the unavailable telecommunication feature are inputted into a computer 112. The party 100 may be identified by a name, a telephone number, and/or an address. The unavailable telecommunication feature may be identified by a feature name or a code corresponding thereto.

Some or all of the information may be inputted by the representative 106 using a keyboard, a pointing device such as a mouse, or an alternative input interface of the computer 112. Optionally, caller identification data received with the telephone call may be communicated from the telephone line 110 to an interface of the computer 112.

As indicated by block 24, the computer 112 stores a data structure which identifies the party 100 and the telecommunication feature in a database 114. The database 114 comprises a computer-readable medium whose contents encode the data structure. In addition, the contents of the computer-readable medium may encode data structures identifying other parties who inquired about unavailable telecommunication features.

Thereafter, as indicated by block 26, availability data is inputted into the computer 112. The availability data indicates an availability of a telecommunication feature to at least a portion of the telecommunication network 102. The availability data may indicate a telecommunication feature by a feature name or a feature code. The availability data may indicate a portion of the telecommunication network 102 by either a local access and transport area (LATA) code, a numbering plan area code, a central office code, a ZIP code, or any combination thereof.

As indicated by block 30, the data structure and the availability data are processed to determine if the telecommunication feature has become available to the party 100. Processing the data structure and the availability data may include determining if the party 100 is within the portion of the telecommunication network 102, and determining if the party-inquired telecommunication feature corresponds to the newly-available telecommunication feature.

If the telecommunication feature remains unavailable to the party 100, the processing act indicated by block 30 is subsequently performed based upon subsequently-inputted availability data indicated by block 26.

If the telecommunication feature has become available to the party 100, the party 100 is notified that the telecommunication feature has become available to him/her. Preferably, the party 100 is notified by first notifying either the representative 106 or another representative that the telecommunication feature has become available to the party 100 (block 32). This first notification action may be performed by retrieving at least a portion of the data structure from the database 114, and displaying the party information and feature information to either the representative 106 or another representative.

As indicated by block 34, a telephone call is placed to the party 100. In the telephone call, either the representative 106 or another representative uses the displayed information to inform the party 100 of the availability of the telecommunication feature (block 36).

In the telephone call, the party 100 is given an opportunity to purchase or subscribe to the telecommunication feature. If the party 100 requests the telecommunication feature, either the representative 106 or another representative may input information indicating same to the computer 112 (block 40), and may initiate acts to provide the telecommunication feature to the party 100 (block 42). If the party 100 declines, either the representative 106 or another representative may input information indicating same to the computer 112 (block 44). Optionally, the computer 112 may delete the data structure from the database 114.

To illustrate an embodiment of the present invention, consider the party 100 calling the service representative 106 to inquire about a privacy manager service. In the telephone call, the party 100 is informed that the privacy manager service is unavailable to him/her. A first data structure identifying the party 100 and the privacy manager service is stored in the database 114.

Also consider a party 120 who calls either the service representative 106 or another service representative to inquire about the privacy manager service. The party 120 places the telephone call using a telephone terminal 121. In the telephone call, the party 120 is informed that the privacy manager service is unavailable to him/her. A second data structure identifying the party 120 and the privacy manager service is stored in the database 114.

Further consider a party 122 who calls either the service representative 106 or another service representative to inquire about a talking call waiting service. The party 122 places the telephone call using a telephone terminal 124. In the telephone call, the party 122 is informed that the talking call waiting service is unavailable to him/her. A third data structure identifying the party 122 and the talking call waiting service is stored in the database 114.

After the aforementioned three telephones calls have terminated, consider that a portion of telecommunication network 102 has been upgraded to make the privacy manager service available. Availability data which indicates the privacy manager service and the portion of the telecommunication network 102 is inputted. Consider that the portion of the telecommunication network 102 includes the party 100 and the party 122, but excludes the party 120.

The first data structure, the second data structure, the third data structure, and the availability data are processed to determine that the privacy manager service has become available to the party 100. Based on said processing, the privacy manager service is determined to remain being unavailable to the party 120, and the talking call waiting service is determined to remain being unavailable to the party 122.

The party 100 is notified, by a telephone call, that privacy manager service has become available to him/her. In the telephone call, the party 100 may subscribe to the privacy manager service.

For the purpose of this patent application, the term "available" includes being available for use, and includes being available for purchase or subscription. For example, a telecommunication feature may be made available for purchase or subscription at a time prior to its availability for use.

Embodiments of the herein-disclosed methods may be directed by computer-readable instructions encoded on a computer-readable medium. The contents of the computer-readable medium cause a computer to perform the herein-disclosed acts. For this purpose, at least one computer processor associated with the one or more of the herein-disclosed elements is responsive to the contents of the computer-readable medium.

Examples of the computer-readable medium include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

Thus, there has been described herein several embodiments including preferred embodiments of a method, system and medium for determining an availability of a telecommunication feature.

It will be apparent to those skilled in the art that the disclosed invention may be modified in numerous ways and may assume many embodiments other than the preferred form specifically set out and described above. For example, more than one computer can access the database 114 to store data structures and/or to process data structures in light of accessibility data. Further, a plurality of representatives may assist in inputting party identification information and feature identification information for storage in the database 114.

Still further, some acts described herein may be automated rather than performed by the representative 106. For example, as an alternative to the party calling a representative, the party may inquire about the availability of a telecommunication feature by calling an interactive voice response (IVR) unit or linking to a computer (e.g. one providing a Web site) accessible via a computer network (e.g. an internet, an intranet or an extranet). Either the IVR or the computer processes the inquiry in accordance with the acts disclosed herein. To subsequently inform the party of the availability of a previously-unavailable feature, either the IVR or the computer may communicate with the party via electronic mail, direct mail, a fax, an automated telephone call, or a Web site.

Yet still further, as an alternative to receiving a party-initiated inquiry to the availability of a telecommunication feature, embodiments of the present invention may be adapted for use by an outbound telemarketing service. In this case, for example, a telemarketing service may call or otherwise contact a party to suggest one or more products or services. The telemarketing service may initiate the herein-described inquiry about the availability of a telecommunication feature to the party. If unavailable, the telemarketing service may perform some or all of the remaining acts, resulting in an act of notifying the party when the feature has become available.

Accordingly, it is intended by the appended claims to cover all modifications of the invention which fall within the true spirit and scope of the invention.

What is claimed is:

1. A method comprising:
    inquiring in a first transaction about a first telecommunication feature unavailable to a first party of a telecommunication network;
    in accordance with the inquiring in the first transaction, storing a first data structure which identifies the first party of the telecommunication network and the first telecommunication feature unavailable to the first party;
    after storing the first data structure, and after completion of the first transaction, upgrading a portion of the telecommunication network which serves the first party;
    in accordance with upgrading the portion of the telecommunication network which serves the first party, inputting availability data which indicates an availability of the first telecommunication feature to the portion of the telecommunication network which serves the first party;
    in response to upgrading the portion of the telecommunication network which serves the first party, processing the first data structure and the availability data to determine that the first telecommunication feature has become available to the first party; and
    placing a call to the first party to inform the first party that the first telecommunication feature has become available, wherein placing the call to inform the first party that the first telecommunication feature has become available occurs before the first party has subscribed to the first telecommunication feature, wherein the placing of the call to the first party occurs in response to the inquiring in the first transaction, the upgrading the portion of the telecommunication network, and the processing of the first data structure and the availability data, wherein the first party has the opportunity to subscribe to the first telecommunication feature after the call is placed.

2. The method of claim 1 further comprising:
    before inputting the availability data, storing a second data structure which identifies a second party of the telecommunication network and the first telecommunication feature unavailable to the second party; and
    processing the second data structure and the availability data to determine that the first telecommunication feature remains unavailable to the second party.

3. The method of claim 1 before inputting availability data, storing a second data structure which identifies a second party of the telecommunication network and a second telecommunication feature unavailable to the second party; and
    processing the second data structure and the availability data to determine that the second telecommunication feature remains unavailable to the second party.

4. The method of claim 1 further comprising, prior to inputting the availability data:
    receiving a call from the first party; and
    informing, in the call, that the first telecommunication feature is unavailable to the first party.

5. The method of claim 1 wherein the first telecommunication feature comprises a telecommunication service.

6. The method of claim 1 wherein the first telecommunication feature comprises a telecommunication product.

7. The method of claim 1 wherein the telecommunication network comprises a telephone network.

8. A method comprising:
    receiving a first call from a first party of a telecommunication network;
    determining that a first telecommunication feature is unavailable to the first party;
    informing, in the first call, that the first telecommunication feature is unavailable to the first party;
    storing a first data structure which identifies the first party and the first telecommunication feature unavailable to the first party;
    receiving a second call from a second party;
    determining that a second telecommunication feature is unavailable to the second party;
    informing, in the second call, that the second telecommunication feature is unavailable to the second party;
    storing a second data structure which identifies the second party and the second telecommunication feature unavailable to the second party;
    receiving a third call from a third party;
    determining that the first telecommunication feature is unavailable to the third party;
    informing, in the third call, that the first telecommunication feature is unavailable to the third party;
    storing a third data structure which identifies the third party and the first telecommunication feature unavailable to the third party;
    after storing the first data structure, the second data structure, and the third data structure and after the first call, the second call, and the third call have terminated, upgrading a portion of the telecommunication network which serves the first party;
    in accordance with upgrading the portion of the telecommunication network which serves the first party, inputting availability data which indicates and availability of the first telecommunication feature to a portion of the telecommunication network which serves the first party but not the third party;
    in response to upgrading the portion of the telecommunication network which serves the first party, processing the first data structure, the second data structure, the third data structure, and the availability data to determine that the first telecommunication feature has become available to the first party but remains unavailable to the third party; and
    after the first call, the second call, and the third call have terminated, notifying the first party in a fourth call that the first telecommunication feature has become available to the first party by placing a call to the first party, wherein notifying the first party that the first telecommunication feature has become available occurs before the first party has subscribed to the first telecommunication feature, wherein the placing of the call to the first party occurs in response to the receiving of the first call, the second call and the third call, the upgrading the portion of the telecommunication network, and the processing of the first data structure, the second data structure, the third data structure and the availability data, wherein the first party has the opportunity to subscribe to the first telecommunication feature after the fourth call is placed.

9. An apparatus comprising:
a database comprising a first data structure which identifies a first party of a telecommunication network and a first telecommunication feature unavailable to the first party, wherein the first data structure is generated in response to a first inquiry;
a computer to receive availability data which indicates an availability of the first telecommunication feature to a portion of the telecommunication network which serves the first party, wherein the computer receives availability data after the completion of the first inquiry and after generation of the first data structure and in accordance with upgrading the portion of the telecommunication network which serves the first party, the computer to process the first data structure and the availability data in response to upgrading the portion of the telecommunication network which serves the first party to determine that the first telecommunication feature has become available to the first party, and the computer to place a call to the first party to inform the first party that the first telecommunication feature has become available, wherein placing the call to inform the first party that the first telecommunication feature has become available occurs before the first party has subscribed to the first telecommunication feature, wherein the placing of the call occurs in response to the first inquiry, the upgrading the portion of the telecommunication network, and the processing of the first data structure and the availability data, wherein the first party has the opportunity to subscribe to the first telecommunication feature after the call is placed.

10. The apparatus of claim 9 wherein the database further comprises a second data structure which identifies a second party of the telecommunication network and the first telecommunication feature unavailable to the second party, and wherein the computer is to process the second data structure and the availability data to determine that the first telecommunication feature remains unavailable to the second party.

11. The apparatus of claim 9 wherein the database further comprises a second data structure which identifies a second party of the telecommunication network and a second telecommunication feature unavailable to the second party, and wherein the computer is to process the second data structure and the availability data to determine that the second telecommunication feature remains unavailable to the second party.

12. The apparatus of claim 9 wherein the first telecommunication feature comprises a telecommunication service.

13. The apparatus of claim 9 wherein the first telecommunication feature comprises a telecommunication product.

14. The apparatus of claim 9 wherein the telecommunication network comprises a telephone network.

15. A computer-readable medium whose contents cause a computer to store a first data structure which identifies a first party of a telecommunication network and a first telecommunication feature unavailable to the first party, after completion of storage of the first data structure, and after, at a later time, upgrading a portion of the telecommunication network which serves the first party, in accordance with the upgrading, receiving availability data which indicates an availability of the first telecommunication feature to the portion of the telecommunication network which serves the first party, and to process the first data structure and the availability data in response to upgrading the portion of the telecommunication network which serves the first party to determine that the first telecommunication feature has become available to the first party, and placing a call to the first party to inform the first party that the first telecommunication feature has become available, wherein placing the call to inform the first party that the first telecommunication feature has become available occurs before the first party has subscribed to the first telecommunication feature, wherein the placing of the call to the first party occurs in response to the storing of the first data structure, the upgrading the portion of the telecommunication network, and the processing of the first data structure and the availability data, wherein the first party has the opportunity to subscribe to the first telecommunication feature after the call is placed.

16. The computer readable medium of claim 15 wherein the contents further cause the computer to store a second data structure which identifies a second party of the telecommunication network and the first telecommunication feature unavailable to the second party, and to process the second data structure and the availability data to determine that the first telecommunication feature remains unavailable to the second party.

17. The computer readable medium of claim 15 wherein the contents further cause the computer to store a second data structure which identifies a second party of the telecommunication network and a second telecommunication feature unavailable to the second party, and to process the second data structure and the availability data to determine that the second telecommunication feature remains unavailable to the second party.

18. The computer readable medium of claim 15 wherein the first telecommunication feature comprises a telecommunication service.

19. The computer readable medium of claim 15 wherein the first telecommunication feature comprises a telecommunication product.

20. The computer readable medium of claim 15 wherein the telecommunication network comprises a telephone network.

21. The method of claim 1 further comprising:
after completion of the first transaction, at a later time notifying the first party in a second transaction that the first telecommunication feature has become available to the first party.

22. The apparatus of claim 9 wherein, after completion of the first inquiry, generation of the first data structure, and determining that the first telecommunication feature has become available to the first party, the computer outputs a signal to initiate notifying the first party that the first telecommunication feature has become available to the first party.

23. The computer-readable medium of claim 15 wherein, after completion of storage of the first data structure and after processing the first data structure and the availability data, the contents further cause the computer to output a signal to initiate notifying the first party that the first telecommunication feature has become available to the first party.

24. The method of claim 1 further comprising:
updating the first data structure with information regarding the first party at least one of requesting and denying the first telecommunications service in accordance with a response by the first party to the call.

25. The method of claim 8 further comprising:
updating the first data structure with information regarding the first party at least one of requesting and denying the first telecommunications service in accordance with a response by the first party to the fourth call.

26. The apparatus of claim 9 wherein the first data structure is updated with information regarding the first party at least one of requesting and denying the first telecommunications service in accordance with a response by the first party to the call.

27. The computer readable medium of claim 15 wherein the first data structure is updated with information regarding the first party at least one of requesting and denying the first telecommunications service in accordance with a response by the first party to the call.

* * * * *